United States Patent [19]

Sönsteröd

[11] Patent Number: 5,409,088
[45] Date of Patent: Apr. 25, 1995

[54] SHOCK ABSORBER

[75] Inventor: Lars Sönsteröd, Upplands Väsby, Sweden

[73] Assignee: Yamaha Hatsudoki Kabushiki Kaisha, Iwata, Japan

[21] Appl. No.: 865,360

[22] Filed: Apr. 8, 1992

[30] Foreign Application Priority Data

Apr. 12, 1991 [JP] Japan .................... 3-106456
Apr. 12, 1991 [JP] Japan .................... 3-106458

[51] Int. Cl.6 .................................. F16F 9/46
[52] U.S. Cl. ........................... 188/299; 137/542
[58] Field of Search ............. 188/299, 280, 282, 319, 188/285, 275, 288, 322.15; 280/707; 137/542

[56] References Cited

U.S. PATENT DOCUMENTS

| 4,854,429 | 8/1989 | Casey | 188/299 |
| 4,946,009 | 8/1990 | Knutson | 188/299 |
| 5,064,032 | 11/1991 | Ashiba | 188/299 |
| 5,078,240 | 1/1992 | Ackermann et al. | 188/299 |

FOREIGN PATENT DOCUMENTS

| 0330634 | 8/1989 | European Pat. Off. | 188/299 |
| 2637033 | 3/1990 | France | 188/299 |

Primary Examiner—Matthew C. Graham
Attorney, Agent, or Firm—Knobbe, Martens, Olson & Bear

[57] ABSTRACT

An electrically controlled shock absorber comprised of a piston element having a cavity in which a pair of sub-assemblies are contained. One sub-assembly comprises a pilot valve and its actuator and the other sub-assembly comprises a poppet valve. The two sub-assemblies have cooperating passages for defining the flow passage between the two chambers defined by the piston assembly. This construction permits the sub-assemblies to be tested before complete assembly and facilitates the manufacturing of the unit.

27 Claims, 4 Drawing Sheets

SHOCK ABSORBER

BACKGROUND OF THE INVENTION

This invention relates to a shock absorber and more particularly to an improved and simplified ride control type of shock absorber.

A type of shock absorber has been proposed for vehicles such as automobiles and motorcycles wherein the damping force can be varied to suit either the rider or driver's desires or road conditions. This is done by providing an electrically operated pilot valve in the piston of the shock absorber. This pilot valve is electrically controlled to vary the pressure at which it opens and, accordingly, the damping characteristics of the shock absorber.

In addition to the pilot valve and its actuator, the piston must carry other valves and passages for its operation. Since all of these components are formed within the piston, prior art constructions have been quite complicated and difficult to manufacture and assemble. Also since all of the components are mounted internally within the piston, with prior art type of constructions it has not been possible to test the individual components before assembly. The disadvantages of this are believed to be obvious.

It is, therefore, a principal object to this invention to provide an improved shock absorber that can having its action externally controlled and yet which is simple in construction and assembly.

It is a further object of this invention to provide a controlled shock absorber that is manufactured from a number of sub-components which may be easily inserted into the piston of the shock absorber as respective units.

It is a further object to this invention to provide an improved shock absorber assembly of this general type.

In connection with shock absorbers of the type described, the pilot valves has heretofore comprised a spool valve that operates to control the flow between two chambers and, accordingly, the action of the shock absorber. However, the use of spool valves has a number of disadvantages. Specifically, the port and spool gives a delay in action and also if attempts are made to reduce this delay then leakage and reliability become problems. It has also been proposed to replace the spool valve with a poppet valve but the poppet valve has a problem in that the head of the poppet valve overlaps the valve seat and causes flow restrictions and also action on the valve which tends to cause it to be drawn back to its valve seat or vibrate.

It is, therefore, a still further object to this invention to provide an improved valve for a shock absorber which has the advantages of a poppet valve without the normal disadvantages of a poppet valve.

SUMMARY OF THE INVENTION

A first feature of this invention is adapted to be embodied in a piston assembly for use in an electrically controlled shock absorber. The piston assembly comprises a piston element that is adapted to be positioned in a cylinder bore to define a pair of spaced apart chambers on opposite sides of the piston element. The piston element has a cavity formed in it that faces one of the chambers formed in by the piston element. A first sub-assembly comprised of a pilot valve assembly and actuator is received and retained in the piston cavity. The pilot valve assembly controls the pressure at which the flow between the chambers is permitted under shock absorbing action under the control of the actuator. A second sub-assembly comprised of main passage forming means forming at least in part passages for flow between the chambers and a poppet valve for controlling the flow therethrough is received and secured within the piston cavity.

Another feature of the invention is adapted to be embodied in a valve construction for a shock absorber for controlling the flow through a passage. The poppet valve has a valving portion that is substantially equal in diameter to the passage and which is reciprocally supported relative to the passage. This poppet valve portion has outstanding projections which engage the member that defines the passage for limiting the degree of movement of the poppet valve to its closed position without offering significant restriction to flow when the poppet valve is in its opened position.

DETAILED DESCRIPTION OF THE PREFERRED EMBODIMENT OF THE INVENTION

Figure 1:
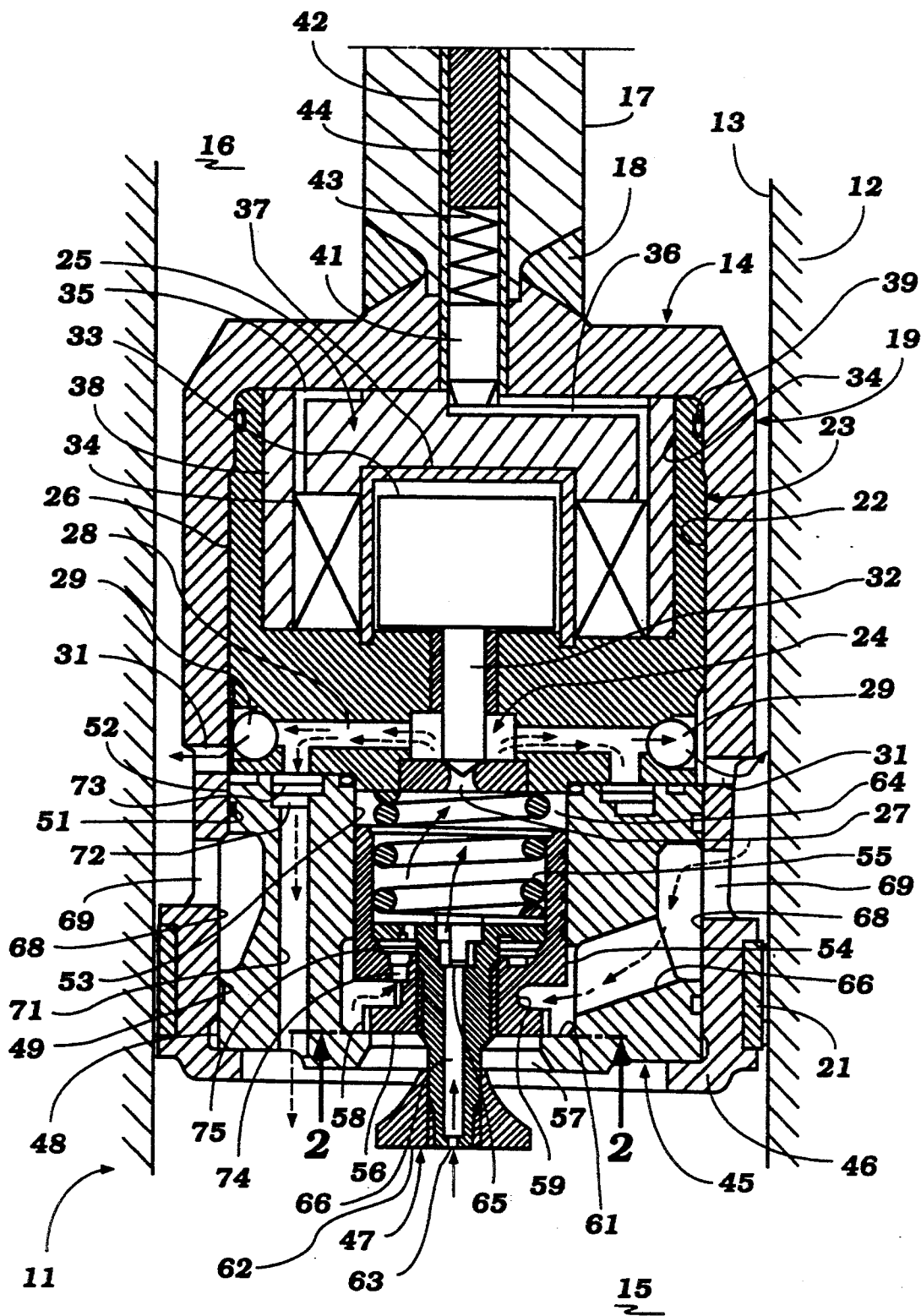
FIG. 1 is a cross sectional view taken through a shock absorber constructed in accordance with an embodiment of the invention.

Referring now in detail to the drawings and initially primarily to FIG. 1, an electrically controlled shock absorber constructed in accordance with an embodiment of the invention is depicted partially and identified generally by the reference numeral 11. The shock absorber 11 includes a main body cylinder 12 having a bore 13 in which a piston assembly, indicated generally by the reference numeral 14 is supported for reciprocal movement. The piston 14 in effect divides the cylinder bore 13 into first and second chambers 15 and 16, respectively. The lower end of the chamber 15 is closed and the cylinder 12 is affixed to a component of the vehicle.

A piston rod 17 is affixed, by a welded joint 18 to the piston assembly 14 and extends through the chamber 16. The piston rod 17, as is well known in this art, extends through a seal at the respective end of the cylinder 12 and is connected to another component of the vehicle suspension system so that the piston assembly 14 will reciprocate relative to the cylinder 12 as the suspension travel occurs. By forming a welded connection between the piston rod 17 and piston assembly 14, it is possible to simplify the construction and also obtain greater accuracy for it.

The piston assembly 14 includes a piston element 19 that carries a seal 21 as its lower periphery which is sealingly engaged with the cylinder bore 13 so as to seal the chambers 15 and 16 from each other. In accordance with an important feature of the invention, the piston element 19 is formed with a cavity, indicated generally by the reference numeral 22 which opens through the face of the piston element 19 into the cavity 15.

A first sub-assembly, indicated generally by the reference numeral 23 and comprised of a pilot valve, indicated generally by the reference numeral 24 and actuating solenoid therefore, indicated generally by the reference numeral 25 is inserted into the upper end of the cavity 22, in a manner which will be described. As will be readily apparent, the sub-assembly 23 may be completely assembled outside of the piston element 19 and its components tested before assembly therein.

The sub-assembly 23 includes a main body portion 26 formed from an appropriate material and which has a downwardly facing opening in its lower end into which a member forming an orifice 27 is press fit. The orifice 27 communicates with an internal cavity from which a plurality of radially extending flow passages 28 are formed. Ball type check valves 29 are positioned at the outer ends of the passages 28 and will permit flow from the passages 28 through openings 31 formed in the piston element 19 as shown by the solid line arrows in the figures.

A pilot valve element 32 is slidably supported within the body 26 and controls the opening and closing of the orifice 27.

The actuator solenoid 25 includes an armature 33 that is contained within a cavity 34 of the main body member 26 of the first sub-assembly 23 and which is fixed to or integral with the pilot valve element 32. The armature 33 is surrounded by a solenoid winding 34 from which leads 35 and 36 extend for energizing the winding 34. A non-magnetic cover member 37 encircles the armature 33 and is embedded into the body member 26. A potting compound 38 encapsulates the armature 33, cover member 37, winding 34 and leads 35 and 36 within this sub-assembly 23.

An O-ring seal 39 is provided at the upper portion of the main body member 26 of the first sub-assembly 23 to provide a seal with the cavity 22 of the piston element 19.

The lead 35 is in electrical contact with the metallic piston element 19 and piston rod 17 for external connection to a source of electrical power. The lead 36 is contacted by a sliding contact 41 mounted within an insulating sleeve 42 that extends co-axially through the piston rod 17. A coil compression spring 43 urges the contact 41 into engagement with the lead 36 and electrical energy is transmitted to the spring 43 and contact 41 by a carbon core 44 that extends centrally through the piston rod 17. The carbon core 44 provides an external lead to complete the electrical connection for the solenoid winding 34. A suitable control, of any known type, is provided for controlling the pressure at which the pilot valve 24 and specifically the valve element 32 will open, as will be described.

Figure 5:
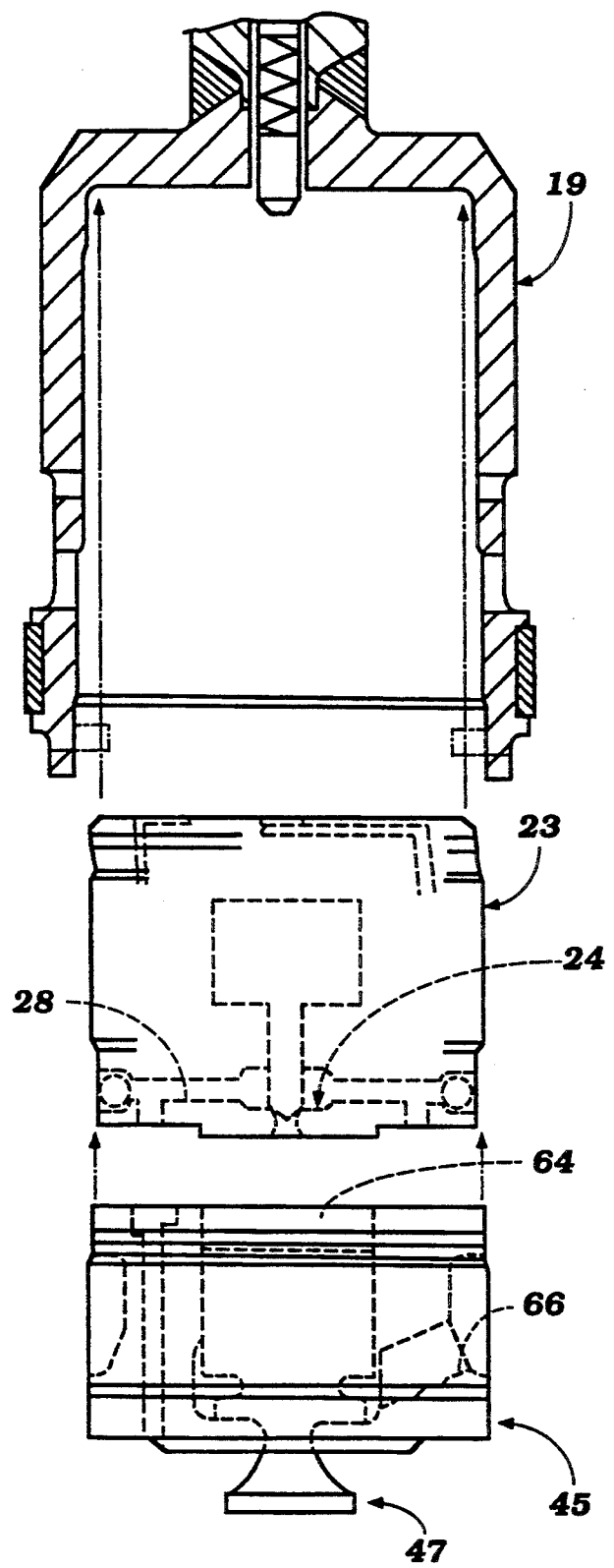
FIG. 5 is a exploded partially cross sectional view of the piston assembly showing how it is assembled.

A second sub-assembly, indicated generally by the reference numeral 45 is contained within the cavity 22 below the first sub-assembly 23. These two sub-assemblies 23 and 45 are fixed within the cavity 22 by rolling or peening over an end portion 46 of the piston element 19 so as to provide a unitary assembly once the components have been assembled, in a manner as best shown in FIG. 5. The sub-assembly 45 forms a number of flow passages and also contains a poppet valve, indicated generally by the reference numeral 47 and which is constructed in accordance with another feature of the invention.

The second sub-assembly 45 includes a main body member 48 formed from a suitable material and which carries a pair of O-ring seals 49 and 51 that provide a sealing engagement with the chamber 22 of the piston element 19. In addition, an O-ring type face seal 52 is mounted in an end face of the main body element 48 and provides a seal with the body member 26 of the first sub-assembly 23.

The body member 48 is formed with an internal bore 53 in which a cylindrical sleeve portion 54 of the poppet valve 47 is slidably supported. A coil compression spring 55 is received within the sleeve portion 54 and engages the body member 26 of the first sub-assembly 23 for urging the poppet valve 47 to its closed position. In this position, a cylindrical end face 56 of the poppet valve 47 is urged into closing engagement with an orifice 57 formed in the lower portion of the main body member 48.

Figure 2:
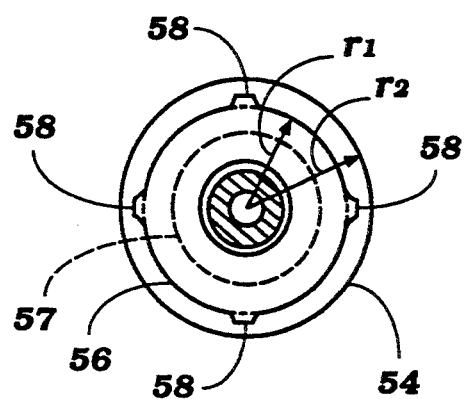
FIG. 2 is a cross sectional view taken along the line 2—2 of FIG. 1.

The cylindrical portion 56 has a diameter which is smaller than the diameter of the bore 53 but which is substantially equal to the orifice 57. A plurality of outwardly extending lugs 58 are formed around the periphery of the cylindrical portion 56 so as to limit the downward movement of the poppet valve 47 under the action of the coil spring 55. However, the lugs 58, as best seen in FIG. 2, are spaced so that they will not offer any significant flow resistance nor will they provide an area on which fluid pressure may act to tend to urge the poppet valve 47 to its closed position. Hence, the poppet valve 47 will provide very effective flow control, low flow resistance and will not tend to flutter or vibrate in its operation.

It should be noted that the radius $r_2$ of the sleeve portion 54 is greater than the radius $r_1$ of the cylindrical portion 56. For optimum operation, the follow equation should be satisfied:

$$\pi(r_2^2 - r_1^2)^2 = 2\pi r_1^2$$

The area between the sleeve portion 54 and the cylindrical portion 56 is formed with a circumferential recess 59 which is positioned within a cavity 61 formed around the upper end of the opening 57 and within the lower portion of the main body member 48.

The lower portion of the poppet valve 47 is formed with a section 62 that is intended to cooperate with the orifice 57 so that when the poppet valve 47 is opened there will be a substantially laminar flow through the orifice 57. That is, the section 62 is intended to reduce turbulence in the flow so as to obtain better damping control.

An orifice 63 is formed in the lower end of the poppet valve 47 and opens into the chamber 15. This orifice communicates the chamber 15 with a chamber 64 formed by the bore 53 and sleeve portion 54 of the poppet valve 47. A check valve 65 is provided at the upper end of a passage 66 that communicates the orifice 63 with the chamber 64 so as to permit flow from the chamber 15 into the chamber 64 but preclude in the reverse direction.

The chamber 61 downstream of the poppet valve 47 communicates with the chamber 16 through an internal passage 66 formed in the main body member 48 which, in turn, communicates with an annular chamber 68 extending around the main body member 48 between the seals 49 and 51. This chamber 68, in turn, communicates with passageways 69 in the piston element 19 on the side of the seal 21 opposed from the chamber 15.

One or more axially extending passages 71 are formed in the main body member 48 of the second sub-assembly 45 and communicate with the chamber 15. The upper ends of these passages 71 communicate with an annular groove 72 formed in the upper end of the main body member 48. Check valves 73 permit flow from the passages 28 to the passages 71 as shown by the broken line arrows under certain conditions, as will be described.

A passageway 74 is formed in the recessed area 57 of the poppet valve 47 and communicates the chamber 61 with the chamber 64. A check valve 75 permits flow from the chamber 61 to the chamber 64 but precludes flow in the opposite direction.

Figure 3:
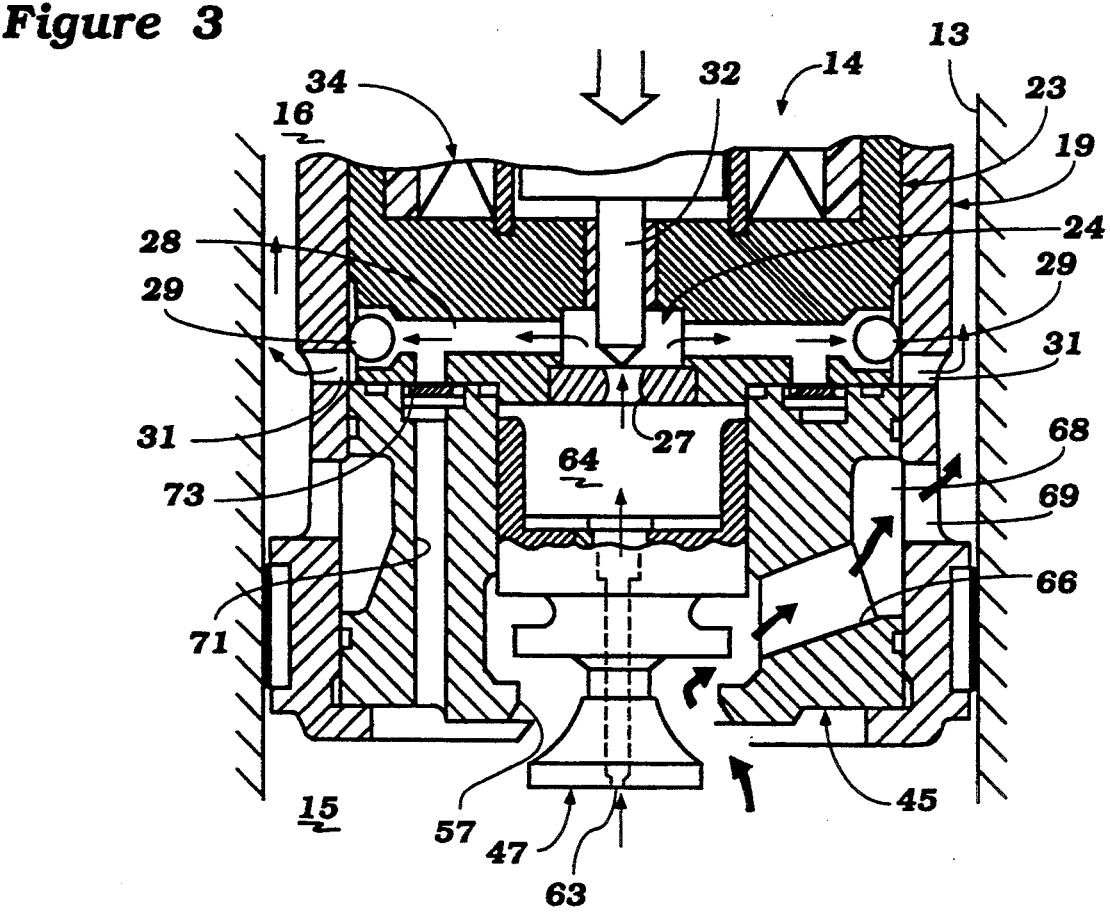
FIG. 3 is an enlarged cross sectional view of the valving portion of the shock absorber during jounce operation.
Figure 4:
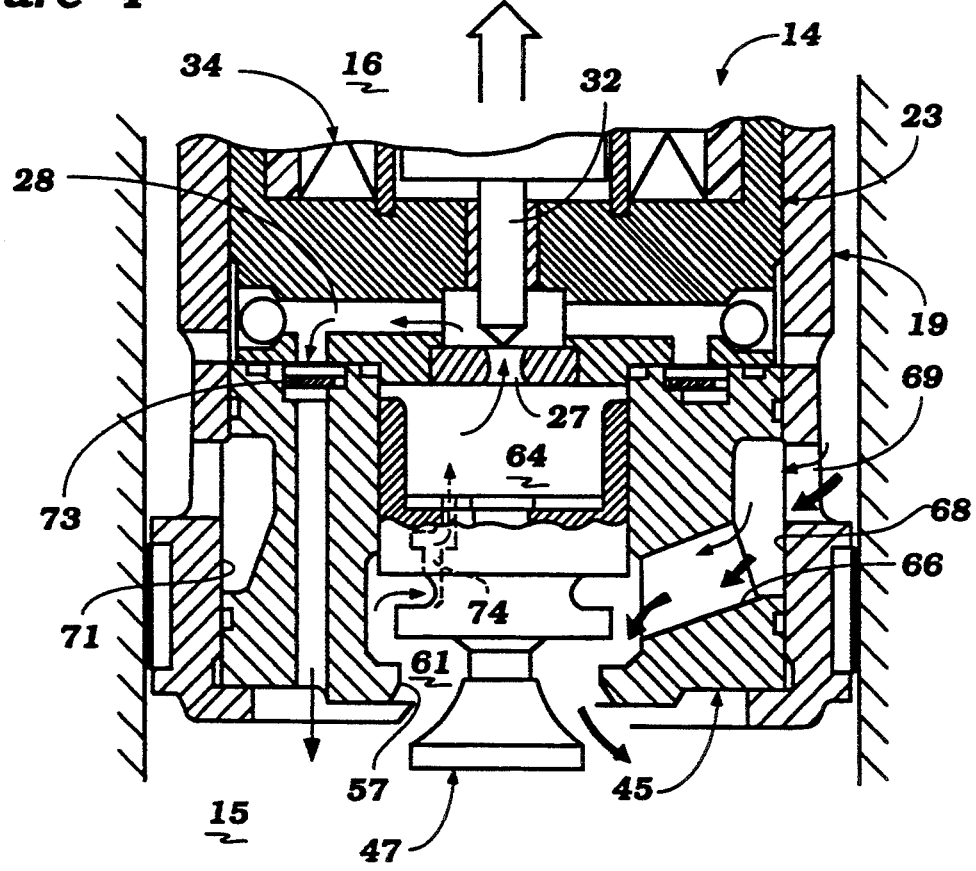
FIG. 4 is an enlarged cross sectional view, in part similar to FIG. 3, and shows the operation during rebound.

The operation of the shock absorber 11 during jounce and rebound will now be described by particular reference to FIGS. 3 and 4 with FIG. 3 showing the jounce action and FIG. 4 showing the rebound action. When a force is exerted on the shock absorber 11 which tends to cause the piston 14 to move downwardly in the bore 13 to compress the fluid in the chamber 15 and reduce the pressure in the chamber 16 (FIG. 3), fluid will flow through the orifice 63 into the chamber 64 and act upon the pilot valve 24. When sufficient pressure is generated in the chamber 64 to overcome the bias on the pilot valve 24 caused by the solenoid 34, which pressure is set by the control afore referred to, the pilot valve member 32 will move upwardly as shown in FIG. 3 to permit flow to occur through the orifice 27 and passages 28 past the check valves 29 and passages 31 into the chamber 16. This reduces the pressure acting on the poppet vale 47 and the poppet valve 47 will open to permit flow through the orifice 57 and passages 66, chamber 68 and passages 69 to the chamber 16. At this time, the pressure acting on the check valves 73 will not be sufficient to cause them to open since the high pressure is on the downstream side in the passages 71.

When the differential pressure between the chambers 15 and 15 falls below the pressure at which the solenoid 34 is set, the pilot valve 32 will move back to its closed position.

During rebound action, the piston assembly 14 tends to move upwardly to compress the fluid in the chamber 16 (FIG. 4). When this occurs, the pressure from the chamber 16 is transmitted through the opening 69 in the piston element 19 to the annular recess 67 and passage 66 to the chamber 61. This pressure in the chamber 61 then passes through the passageway 74 and opens the check valve 75 to enter the chamber 64. When the pressure in the chamber 64 exceeds the pressure at which the solenoid 34 is holding the valve element 32 in its closed position, the pilot valve element 32 will open and flow will pass through the orifice 27 into the passageways 28. This flow then unseats the check valve 73 since the pressure is now lower in the chamber 15 and flow will occur through the passageway 71 into the chamber 15. When the pressure in the chamber 64 is reduced, the poppet valve 47 will open to facilitate flow from the chamber 16 to the chamber 15 through the now opened orifice 57. This motion will continue until the pressure difference in no longer great enough to hold the pilot valve 32 in its opened position.

It should be readily apparent from the foregoing description that the described embodiment of the invention permits the use of a very simply constructed electrically controlled shock absorber wherein the sub-components may be easily assembled out of the piston of the shock absorber and tested before assembly. In addition, the type of poppet valve employed provides good flow control without fluttering or vibrational effects caused due to the pressure difference in the flow across the valving members. Of course, the foregoing description is that of a preferred embodiment of the invention and various changes and modification may be made without departing from the spirit and scope of the invention, as defined by the appended claims.

I claim:

1. A piston assembly for use in an electrically controlled shock absorber, said piston assembly comprising a piston element adapted to be positioned in a cylinder bore to define a pair of spaced apart chambers on opposite sides of said piston element, said piston element having a cavity formed therein facing one of the chambers formed by said piston element and closed at the other end by an integral wall of said piston element, a first sub-assembly comprised of a pilot valve assembly and actuator received and retained in said piston cavity, said pilot valve assembly controlling the pressure at which flow between said chambers is permitted under shock absorbing action under the control of said actuator, and a second sub-assembly comprised of a main passage forming member forming at least in part passages for flow between said chambers and a poppet valve for controlling the flow therethrough received and retained in said piston cavity.

2. A piston assembly as set forth in claim 1 wherein the first and second sub-assemblies are positioned within the piston cavity in abutting relationship with each other and are retained in the cavity by a deformed portion of the piston element.

3. A piston assembly as set forth in claim 2 wherein the first and second sub-assemblies have cooperating passages that permit flow between the chambers and through the first and second sub-assemblies.

4. A piston assembly as set forth in claim 1 wherein the first sub-assembly comprises a first sub-assembly main body element having a cavity receiving an solenoid winding and actuator for the pilot valve, a passage for communicating the first and second chambers with each other and an orifice controlled by the pilot valve for determining the pressure at which the pilot valve opens.

5. A piston assembly as set forth in claim 4 wherein the solenoid winding is potted into the cavity of the first sub-assembly main body member.

6. A piston assembly as set forth in claim 5 further including a pair of terminals for the solenoid, the first of said terminals cooperating with a conductor passing through a piston rod affixed to the piston and the second of the conductors communicating directly with the piston rod.

7. A piston assembly as set forth in claim 1 wherein the second sub-assembly comprises a second sub-assembly main body member having an opening formed therein with which the poppet valve cooperates for controlling the flow between the chambers.

8. A piston assembly as set forth in claim 7 wherein the opening is aligned with a bore formed in the second sub-assembly main body member and in which a sleeve portion of the poppet valve is slidably supported, said opening being smaller in diameter than the diameter of said bore.

9. A piston assembly as set forth in claim 8 wherein the poppet valve has cylindrical portion having a diameter substantially equal to the diameter of the opening and a plurality of outwardly extending projections adapted to engage the second sub-assembly main body member around the opening to limit the degree of closing of the poppet valve without interfering with the flow through the poppet valve without said poppet valve is opened.

10. A piston assembly as set forth in claim 9 wherein the first sub-assembly comprises a first sub-assembly main body member having a cavity receiving an solenoid winding and actuator for the pilot valve, a passage for communicating the first and second chambers with each other and an orifice controlled by said pilot valve for determining the pressure at which said pilot valve opens.

11. A piston assembly as set forth in claim 10 wherein the solenoid winding is potted into the cavity of the first sub-assembly main body member.

12. A piston assembly as set forth in claim 11 further including a pair of terminals for the solenoid, the first of said terminals cooperating with a conductor passing through a piston rod affixed to the piston and the second of the conductors communicating directly with the piston rod.

13. A poppet valve assembly comprised of a member defining a flow orifice, a poppet valve having a cylindrical portion having a diameter substantially equal to the diameter of said flow orifice, and projections formed on said cylindrical member at spaced locations therearound for engaging the member defining said flow orifice for limiting the degree of closing movement of said poppet valve without restricting the flow therepast when said poppet valve is in its opened position.

14. A poppet valve as set forth in claim 13 wherein the poppet valve further has a sleeve portion to which the cylindrical portion is affixed and received in a bore of the member which defines the flow orifice and further including baising spring means acting upon said sleeve portion for urging said poppet valve to its closed position.

15. A poppet valve as set forth in claim 14 wherein the diameter of the sleeve portion is larger than the diameter of the cylindrical portion.

16. A piston assembly for use in an electrically controlled shock absorber formed by the method of forming a piston element adapted to be positioned in a cylinder bore to define a pair of spaced apart chambers on opposite sides of said piston element with a cavity formed therein facing one of said chambers formed by said piston element and closed at the other end by an integral wall of said piston element, inserting a first sub-assembly comprised of a pilot valve assembly and an actuator in said piston cavity in engagement with said integral end wall at the end of said cavity, said pilot valve assembly controlling the pressure at which flow between said chambers is permitted under shock absorbing action under the control of said actuator, and inserting a second sub-assembly comprised of a main passage forming member forming at least in part passages for flow between said chambers and a poppet valve for controlling the flow therethrough into said piston cavity in abutment with said first sub-assembly, and retaining said second sub-assembly within said piston cavity.

17. A piston assembly as set forth in claim 16 wherein the second sub-assembly is retained within the cavity by deforming a portion of the piston element into engagement with second sub-assembly.

18. A piston assembly as set forth in claim 17 wherein the first and second sub-assemblies have cooperating passages that permit flow between the chambers and through the first and second sub-assemblies.

19. A piston assembly as set forth in claim 16 wherein the first sub-assembly comprises a first sub-assembly main body element having a cavity receiving an solenoid winding and actuator for the pilot valve, a passage for communicating the first and second chambers with each other and an orifice controlled by the pilot valve for determining the pressure at which the pilot valve opens.

20. A piston assembly as set forth in claim 19 wherein the solenoid winding is potted into the cavity of the first sub-assembly main body member.

21. A piston assembly as set forth in claim 20 further including a pair of terminals for the solenoid, the first of said terminals cooperating with a conductor passing through a piston rod affixed to the piston and the second of the conductors communicating directly with the piston rod.

22. A piston assembly as set forth in claim 16 wherein the second sub-assembly comprises a second sub-assembly main body member having an opening formed therein with which the poppet valve cooperates for controlling the flow between the chambers.

23. A piston assembly as set forth in claim 22 wherein the opening is aligned with a bore formed in the second sub-assembly main body member and in which a sleeve portion of the poppet valve is slidably supported, said opening being smaller in diameter that the diameter of said bore.

24. A piston assembly as set forth in claim 23 wherein the poppet valve has cylindrical portion having a diameter substantially equal to the diameter of the opening and a plurality of outwardly extending projections adapted to engage the second sub-assembly main body member around the opening to limit the degree of closing of the poppet valve without interfering with the flow through the poppet valve when said poppet valve is opened.

25. A piston assembly as set forth in claim 24 wherein the first sub-assembly comprises a first sub-assembly main body member having a cavity receiving an solenoid and actuator for the pilot valve, a passage for communicating the first and second chambers with each other and an orifice controlled by said pilot valve for determining the pressure at which said pilot valve opens.

26. A piston assembly as set forth in claim 25 wherein the solenoid winding is potted into the cavity of the first sub-assembly main body member.

27. A piston assembly as set forth in claim 26 further including a pair of terminals for the solenoid, the first of said terminals cooperating with a conductor passing through a piston rod affixed to the piston and the second of the conductors communicating directly with the piston rod.

* * * * *

UNITED STATES PATENT AND TRADEMARK OFFICE
CERTIFICATE OF CORRECTION

PATENT NO. : 5,409,088
DATED : April 25, 1995
INVENTOR(S) : Lars Sonsterod

It is certified that error appears in the above-identified patent and that said Letters Patent is hereby corrected as shown below:

Title page,
Item [73], Assignee, should be -- Yamaha Hatsudoki Kabushiki and OhlinsRacing Ab --

Signed and Sealed this

Fifteenth Day of February, 2005

JON W. DUDAS
*Director of the United States Patent and Trademark Office*